(12) United States Patent
McKinney

(10) Patent No.: US 9,797,864 B2
(45) Date of Patent: Oct. 24, 2017

(54) CURRENT MONITORING IN ELECTRICALLY ENHANCED AIR FILTRATION SYSTEM

(75) Inventor: Peter Johannes McKinney, Boulder, CO (US)

(73) Assignee: CARRIER CORPORATION, Farmington, CT (US)

( * ) Notice: Subject to any disclaimer, the term of this patent is extended or adjusted under 35 U.S.C. 154(b) by 456 days.

(21) Appl. No.: 14/118,284

(22) PCT Filed: May 14, 2012

(86) PCT No.: PCT/US2012/037762
§ 371 (c)(1),
(2), (4) Date: Nov. 18, 2013

(87) PCT Pub. No.: WO2012/162004
PCT Pub. Date: Nov. 29, 2012

(65) Prior Publication Data
US 2014/0102295 A1    Apr. 17, 2014

Related U.S. Application Data

(60) Provisional application No. 61/489,551, filed on May 24, 2011.

(51) Int. Cl.
*B03C 3/68* (2006.01)
*G01N 27/62* (2006.01)
(Continued)

(52) U.S. Cl.
CPC .............. *G01N 27/62* (2013.01); *B03C 3/09* (2013.01); *B03C 3/12* (2013.01); *B03C 3/155* (2013.01);
(Continued)

(58) Field of Classification Search
CPC combination set(s) only.
See application file for complete search history.

(56) References Cited

U.S. PATENT DOCUMENTS 3,999,964 A * 12/1976 Carr ..................... B03C 3/155
55/499
5,403,383 A * 4/1995 Jaisinghani ............ B03C 3/66
422/22
(Continued)

FOREIGN PATENT DOCUMENTS

EP     0646416 A1 * 4/1995  .......... B03C 3/0175
EP     2062648 A2   5/2009
(Continued)

OTHER PUBLICATIONS

Notification of Transmittal of the International Search Report and the Written Opinion of the International Searching Authority, or the Declaration; PCT/US2012/037762; dated Sep. 17, 2012; 16 pages.
(Continued)

*Primary Examiner* — Duane Smith
*Assistant Examiner* — Sonji Turner
(74) *Attorney, Agent, or Firm* — Cantor Colburn LLP

(57) ABSTRACT

A filtration system includes a frame directing a fluid flow through the filtration system. An ionization array is located in the frame and has an ionizer current flowing therethrough. The system further includes a media filter having a plurality of media fibers arranged to capture particles flowing therethrough and a conductive surface located at the media filter and having a filter current flowing therethrough. A comparator is utilized to determine a difference between the ionizer current and the filter current, and compare that difference to a predetermined range.

7 Claims, 4 Drawing Sheets

(51) Int. Cl.
   *B03C 3/09*   (2006.01)
   *B03C 3/12*   (2006.01)
   *B03C 3/155*  (2006.01)
   *B03C 3/41*   (2006.01)
   *B03C 3/47*   (2006.01)

(52) U.S. Cl.
   CPC .............. *B03C 3/41* (2013.01); *B03C 3/47* (2013.01); *B03C 3/68* (2013.01); B03C 2201/04 (2013.01); B03C 2201/10 (2013.01); B03C 2201/24 (2013.01); B03C 2201/32 (2013.01)

(56) References Cited

U.S. PATENT DOCUMENTS

| | | | | |
|---|---|---|---|---|
| 5,474,600 | A * | 12/1995 | Volodina | A61L 9/22 96/223 |
| 5,549,735 | A * | 8/1996 | Coppom | B03C 3/155 95/78 |
| 5,573,577 | A * | 11/1996 | Joannou | B03C 3/155 96/66 |
| 5,593,476 | A * | 1/1997 | Coppom | B03C 3/155 95/78 |
| 5,669,963 | A * | 9/1997 | Horton | B03C 3/12 96/77 |
| 6,368,392 | B1 * | 4/2002 | Ohtake | B03C 3/38 96/100 |
| 6,506,238 | B1 * | 1/2003 | Endo | B03C 3/12 96/79 |
| 6,635,106 | B2 * | 10/2003 | Katou | B03C 3/12 96/67 |
| 6,785,114 | B2 * | 8/2004 | Gorczyca | B03C 3/155 361/213 |
| 7,025,806 | B2 * | 4/2006 | Coppom | B03C 3/09 264/258 |
| 7,175,695 | B1 * | 2/2007 | Hess | B03C 3/09 55/DIG. 1 |
| 7,332,019 | B2 * | 2/2008 | Bias | B03C 3/025 96/15 |
| 7,404,847 | B2 * | 7/2008 | Hess | B03C 3/49 55/DIG. 1 |
| 7,452,410 | B2 * | 11/2008 | Bergeron | A61L 9/205 95/57 |
| 7,513,933 | B2 * | 4/2009 | Coppom | B03C 3/09 95/70 |
| 7,625,424 | B2 * | 12/2009 | Kiern | A61L 9/16 95/25 |
| 7,713,330 | B2 * | 5/2010 | Bohlen | B03C 3/09 55/470 |
| 7,803,213 | B2 * | 9/2010 | Hess | B03C 3/09 55/DIG. 1 |
| 8,080,094 | B2 * | 12/2011 | Vanderginst | B03C 3/09 96/66 |
| 8,961,659 | B2 * | 2/2015 | McKinney | B01D 46/0032 422/121 |
| 2002/0141131 | A1 * | 10/2002 | Gorczyca | B03C 3/155 361/231 |
| 2002/0152890 | A1 * | 10/2002 | Leiser | B03C 3/155 95/63 |
| 2003/0159584 | A1 * | 8/2003 | Scheuch | B03C 3/155 96/55 |
| 2005/0109204 | A1 * | 5/2005 | Coppom | B03C 3/09 95/15 |
| 2006/0130657 | A1 * | 6/2006 | Bohlen | B03C 3/09 96/58 |
| 2006/0137527 | A1 * | 6/2006 | Joannou | B03C 3/60 96/66 |
| 2006/0180023 | A1 * | 8/2006 | Coppom | B03C 3/09 95/59 |
| 2007/0137480 | A1 * | 6/2007 | Bergeron | A61L 9/205 95/79 |
| 2007/0137486 | A1 * | 6/2007 | Bergeron | A61L 9/205 96/66 |
| 2008/0156186 | A1 * | 7/2008 | McKinney | B03C 3/09 95/2 |
| 2008/0190772 | A1 * | 8/2008 | Greist | B01D 46/0032 204/572 |
| 2010/0251895 | A1 * | 10/2010 | VanDerGinst | B03C 3/09 96/83 |
| 2011/0171094 | A1 * | 7/2011 | Zahedi | B01D 53/323 423/245.1 |
| 2011/0219954 | A1 * | 9/2011 | McKinney | B01D 46/0032 96/55 |
| 2013/0052090 | A1 * | 2/2013 | Bohlen | A61L 9/205 422/121 |
| 2013/0071298 | A1 * | 3/2013 | Tanimura | B03C 3/014 422/187 |

FOREIGN PATENT DOCUMENTS

| | | | |
|---|---|---|---|
| GB | 2308320 A | 6/1997 | |
| WO | WO 9723294 A1 * | 7/1997 | ............ B03C 3/155 |
| WO | WO 9820979 A1 * | 5/1998 | ............ B03C 3/155 |
| WO | WO 2005061115 A1 * | 7/2005 | ............ B03C 3/09 |
| WO | 2008005970 A1 | 1/2008 | |
| WO | 2008019257 A1 | 2/2008 | |
| WO | WO 2008034605 A1 * | 3/2008 | ............ A61L 9/22 |
| WO | 2010048223 A2 | 4/2010 | |
| WO | WO 2011152016 A1 * | 12/2011 | ............ B03C 3/014 |

OTHER PUBLICATIONS

Notification of Transmittal of the International Preliminary Report on Patentability of the International Searching Authority PCT/US2012/037762; dated Nov. 26, 2013; 9 pages.

* cited by examiner

CURRENT MONITORING IN ELECTRICALLY ENHANCED AIR FILTRATION SYSTEM

BACKGROUND OF THE INVENTION

The subject matter disclosed herein relates to air filtration systems. More specifically, electrostatic filters for air filtration systems and installation thereof.

In air filtration systems, for example, electrically enhanced air filtration systems, electrostatic filters installed in the systems collect impurities in an airflow through the system before the airflow is circulated through a space such as a home or other building. The air filtrations utilize high voltage and ions to enhance the particle collection efficiency of the electrostatic filters. Such filters incorporate a conductive electrode into the filter at a downstream side of the filter. In some instances a filtration system may wet, become contaminated with electrically conductive dusts or other particles, or suffer a component failure which results in the high voltage not only producing ions in the system, but resulting in a leakage of charge to other portions of the purification system. Such charge leakage results in a filter performance reduction and often presents a safety hazard.

BRIEF DESCRIPTION OF THE INVENTION

According to one aspect of the invention, a filtration system includes a frame directing a fluid flow through the filtration system. An ionization array is located in the frame and has an ionizer current flowing therethrough. The system further includes a media filter having a plurality of media fibers arranged to capture particles flowing therethrough and a conductive surface located at the media filter and having a filter current flowing therethrough. A comparator is utilized to determine a difference between the ionizer current and the filter current, and compare that difference to a predetermined range.

According to another aspect of the invention, a method of operating an filtration system includes directing a fluid flow through the filtration system and ionizing the fluid flow via an ionizer current flowing through an ionization array. Particles in the fluid flow are collected at a media filter, the media filter having a conductive surface with a filter current flowing therethrough. A difference between the ionizer current to the filter current is determined and the difference between the ionizer current and the filter current is compared to a predetermined range.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
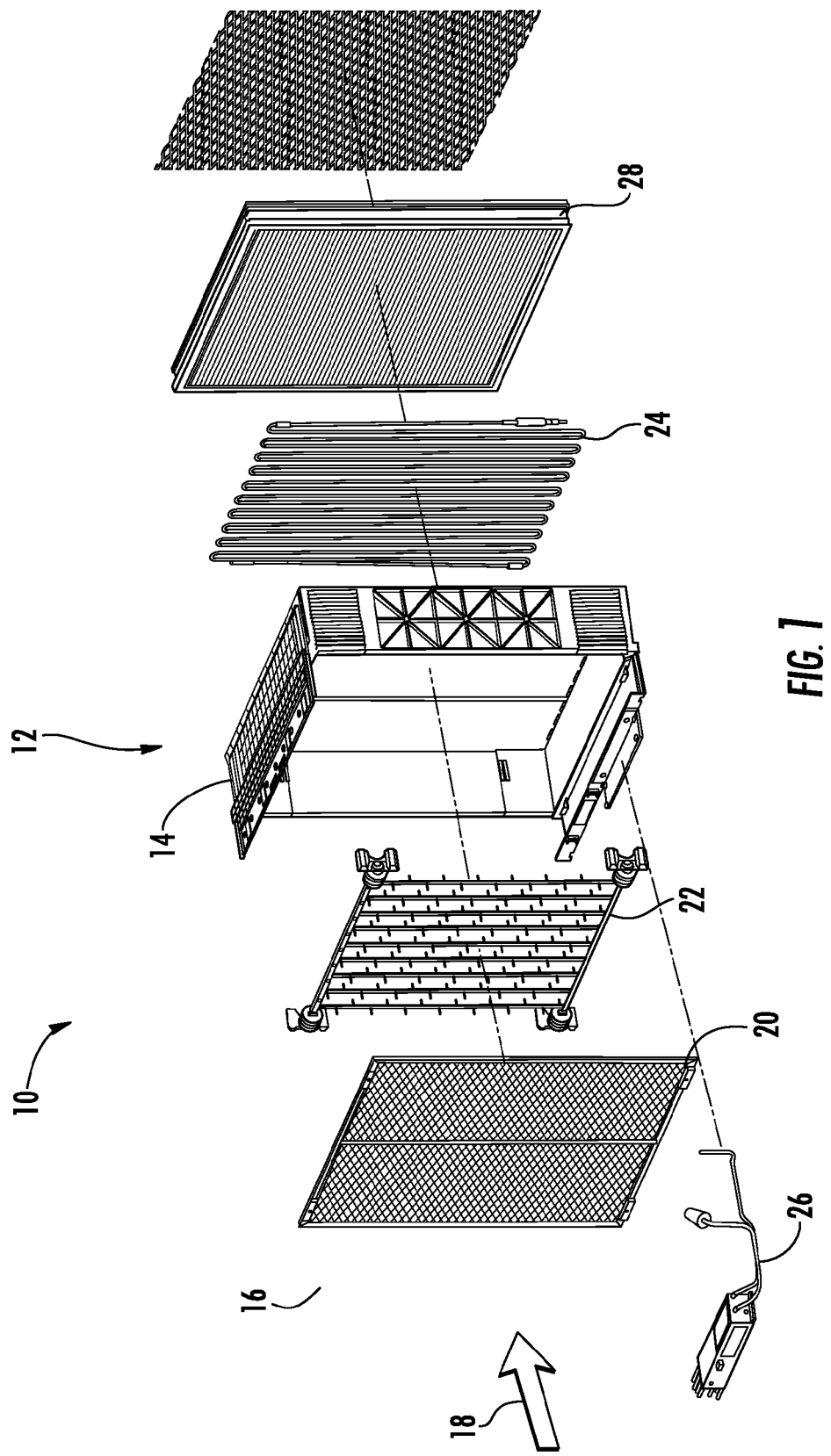
FIG. 1 schematically illustrates an embodiment of an air filtration system.

Shown in FIG. 1 is a view of an embodiment of an air filtration system 10. The air filtration system 10 of FIG. 1 is an electrically enhanced air filtration system 10 having a replaceable filter. It is to be appreciated, however, that electrically enhanced air filtration systems 10 having, for example, cleanable filter elements, are within the scope of the present disclosure.

The air filtration system 10 includes a field enhancement module (FEM) 12, shown exploded in FIG. 1. The FEM 12 includes a frame 14. The frame 14 is configured to arrange the components of the FEM 12 which are secured therein. At an upstream end 16 of the FEM 12, relative to an airflow direction 18 of air through the filtration system 10, is an ionization array 22 with, in some embodiments, a safety screen 20 located upstream of the ionization array 22, which also acts as an upstream ground for the FEM 12. The ionization array 22 is an array of points sufficiently sharp such as to produce corona discharge when a pre-determined voltage is applied. For example, the ionization array may comprise a plurality of thin wires, barbed wires, or any structure capable of producing the corona needed to yield ions. A field-generating array 24 is located downstream of the ionization array 22. It is to be appreciated that, in some embodiments, the field generating array 24 may be omitted from the system 10. The field-generating array 24 and the ionization array 22 are both connected to and powered by a high voltage power supply 26. A media filter 28 is disposed in the frame 14 downstream of the field-generating array 24.

Figure 2:
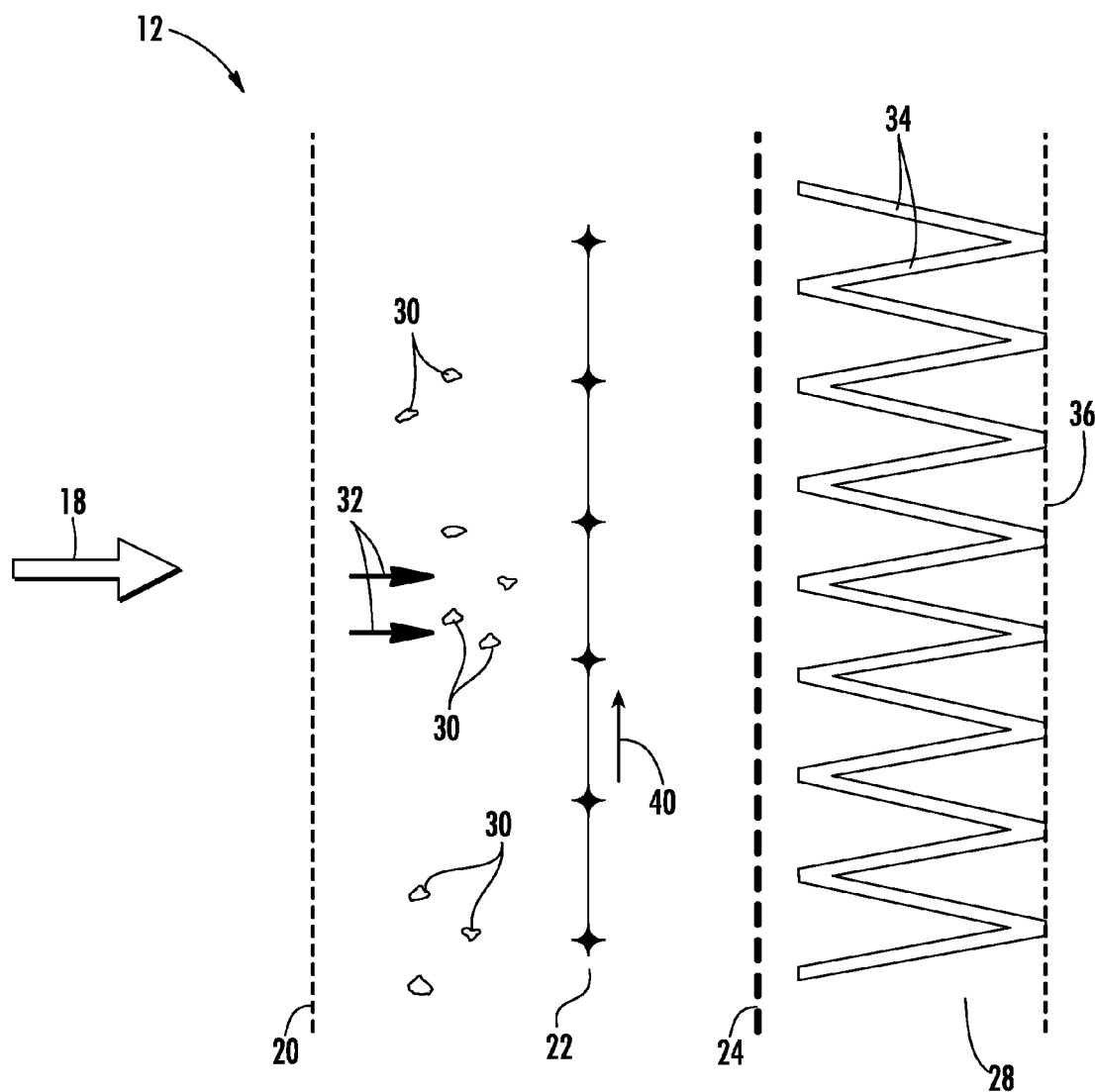
FIG. 2 is a schematic cross-sectional view of an embodiment of an air filtration system.

Referring now to FIG. 2, when the power supply 26 (shown in FIG. 1) is activated, an ionizer current 40 passes through the ionization array 22 to ionize gas (air) molecules via a corona discharge at the array points. The ionized gas molecules charge particles 30 in an airstream 32 passing through the FEM 12. The voltage between the field-generating array 24 and the downstream filter ground polarizes a plurality of media fibers 34 of the media filter 28, which causes the ionized particles 30 to be attracted to and captured by the media fibers 34. Additionally, charge from the ionization array 22 passing into the media filter 28 may charge the fibers to enhance particle 30 capture effectiveness.

Figure 3:
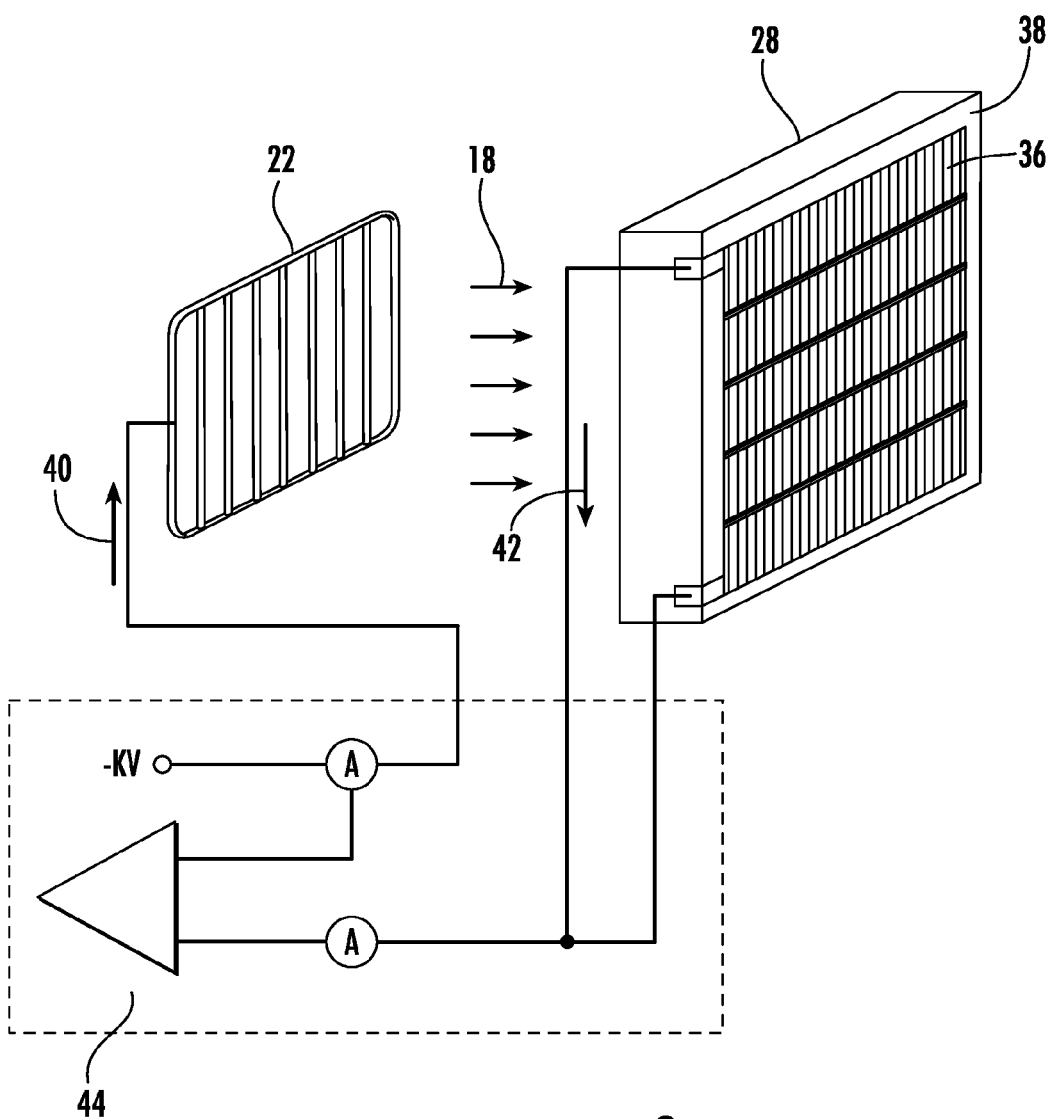
FIG. 3 is a schematic view of an embodiment of a media filter and detection circuit for an air filtration system.

To enhance performance of the media filter 28 and polarize the media fibers 34, the media filter 28 includes a conductive surface 36 at, in some embodiments, a downstream side 38 of the media filter 28. The conductive surface 36 may be, for example, a layer of carbon paint applied to the media filter 28, or a screen affixed to the media filter. The ionizer current 40 passing through the ionization array 22 results in a filter current 42 (FIG. 3) in the conductive surface 36 of the media filter 28, differing by a predetermined amount from the ionizer current 40 during normal operation of the air filtration system 10. Referring to FIG. 3, the air filtration system 10 includes a comparator 44 electrically connected to the ionization array 22 and the media filter 28. The comparator 44 continuously monitors the current difference between the ionizer current 40 and the filter current 42. A current difference outside of a predetermined range indicates a current leakage into the FEM 12, for example, into the frame 14. Current leakage is indicative of poor filtration system 10 health and results in reduced performance of the media filter 28 and, if the current leakage is great enough, could result in a safety hazard, for example, fire or electrical shock.

Figure 4:
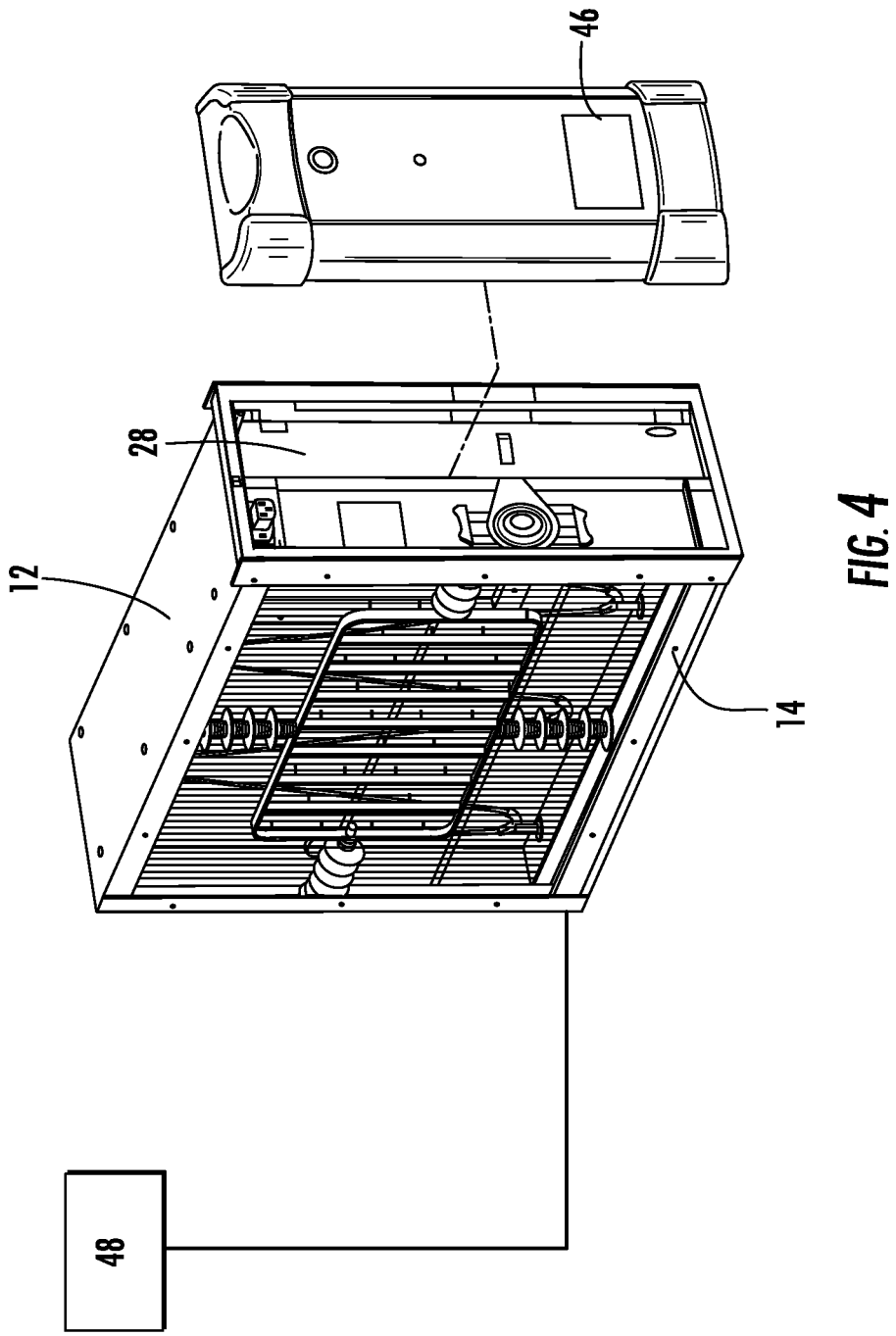
FIG. 4 illustrates another embodiment of an air filtration system.

In some embodiments, once a current difference outside of the predetermined range is measured by the comparator 44, the control system of FEM 12 communicates this information via for example, a warning light or lights, or LED or LCD message at a display 46, shown in FIG. 4, on the air filtration system 10. Further, the information may be communicated to another device, for example, a thermostat 48 or an internet-based location which displays the status of the FEM 12.

In some embodiments, when the current difference is outside of the predetermined range, the air filtration system 10 automatically shuts down in response to the indication of current leakage. In these embodiments, once shut down, the air filtration system 10 may wait for a short period of time, then attempt to restart. If the current leakage is no longer indicated, the air filtration system 10 will continue to operate. If, on the other hand, current leakage is still indicated, the air filtration system 10 will shut down again. As long as current leakage is detected, the shut down and restart process will continue for a predetermined number of times, for example, 5 cycles of shut down and restart, before the air filtration system 10 finally shuts down into a mode requiring user intervention to restart.

While the media filter 28 illustrated is substantially planar, it is to be appreciated that the media filter 28 may be, for example, cylindrical or portions thereof, conical or portions thereof, or partially spherical, or other suitable shape. Further, the flow through the system 10 need not be air, but may be another gaseous and/or liquid flow.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claim.

The invention claimed is:

1. A filtration system comprising:
   a frame directing a fluid flow through the filtration system; and
   an ionization array disposed in the frame configured to ionize a fluid flow past the ionization array;
   a power supply operably connected to the ionization array and applying an ionization current to the ionization array;
   a media filter including;
      a plurality of media fibers arranged to capture particles flowing therethrough; and
      a conductive surface disposed at the media filter and having a filter current flowing therethrough resulting from the ionization current at the ionization array; and
   a comparator to determine a difference between the ionizer current and the filter current, and compare that difference to a predetermined range.

2. The system of claim 1, wherein the comparator is configured such that the difference between the ionizer current and the filter current being outside of the predetermined range is indicative of current leakage in the system.

3. The system of claim 1, further comprising one or more of a warning light, LED display or LCD display to communicate a system status based on the difference between the ionizer current and the filter current.

4. The system of claim 1, wherein the system is communicative with a remotely located device to communicate a system status based on the difference between the ionizer current and the filter current.

5. The system of claim 4, wherein the remotely located device is one of a thermostat or a display device.

6. The system of claim 1, wherein the system is configured to automatically stop operation when the difference between the ionizer current and the filter current is outside of the predetermined range.

7. The system of claim 1, wherein the fluid flow is air flow.

* * * * *